(12) United States Patent
Dixon, Jr. et al.

(10) Patent No.: US 11,441,938 B2
(45) Date of Patent: *Sep. 13, 2022

(54) SELF-WEIGHING CONTAINER

(71) Applicant: UNITED STATES POSTAL SERVICE, Washington, DC (US)

(72) Inventors: Robert Eugene Dixon, Jr., Haymarket, VA (US); S M Elias Farhad, Arlington, VA (US); Ryan Murray Luckay, Vienna, VA (US)

(73) Assignee: UNITED STATES POSTAL SERVICE, Washington, DC (US)

( * ) Notice: Subject to any disclaimer, the term of this patent is extended or adjusted under 35 U.S.C. 154(b) by 36 days.

This patent is subject to a terminal disclaimer.

(21) Appl. No.: 16/886,287

(22) Filed: May 28, 2020

(65) Prior Publication Data

US 2020/0292377 A1  Sep. 17, 2020

Related U.S. Application Data

(63) Continuation of application No. 15/894,666, filed on Feb. 12, 2018, now Pat. No. 10,670,451.

(51) Int. Cl.
| | |
|---|---|
| *G01G 19/52* | (2006.01) |
| *B65D 79/00* | (2006.01) |
| *B65D 25/02* | (2006.01) |
| *G01G 23/36* | (2006.01) |
| *B65D 90/48* | (2006.01) |
| *G01J 1/02* | (2006.01) |
| *G01K 1/02* | (2021.01) |

(Continued)

(52) U.S. Cl.
CPC .............. *G01G 19/52* (2013.01); *B65D 25/02* (2013.01); *B65D 79/00* (2013.01); *B65D 90/48* (2013.01); *B65D 90/513* (2019.02); *G01G 23/36* (2013.01); *B65D 2203/00* (2013.01); *G01J 1/02* (2013.01); *G01J 2001/0257* (2013.01); *G01K 1/024* (2013.01); *G01P 1/07* (2013.01)

(58) Field of Classification Search
CPC ........ G01G 19/52; G01G 23/36; G01G 21/28; B65D 90/513; B65D 25/02; B65D 79/00; B65D 2203/00; G01L 1/02; G01L 2001/0257; G01K 1/024; G01P 1/07
See application file for complete search history.

(56) References Cited

U.S. PATENT DOCUMENTS

| | | | |
|---|---|---|---|
| 6,894,232 B2 | 5/2005 | Waggoner et al. |
| 7,161,097 B1 | 1/2007 | Gorgone |

(Continued)

*Primary Examiner* — Randy W Gibson
(74) *Attorney, Agent, or Firm* — MH2 Technology Law Group, LLP (57) ABSTRACT

A self-weighing container for transporting delivery items includes a weight-sensing device that is configured to sense a weight of a delivery item that is placed inside the container; a microcontroller that is connected to the weight-sensing device; and a display that is connected to the microcontroller. When a delivery item is placed in the container, the weight-sensing device produces a signal that corresponds to the weight of the delivery item and the microcontroller receives the signal and determines the weight of the delivery item based on the signal. The microcontroller may transmit an indication of the weight to the display, which displays the weight based on the indication of the weight, or the microcontroller may transmit the weight to a smart phone for display.

20 Claims, 6 Drawing Sheets

(51) Int. Cl.
　　　*B65D 90/513*　　(2019.01)
　　　*G01K 1/024*　　(2021.01)
　　　*G01P 1/07*　　(2006.01)

(56) References Cited

U.S. PATENT DOCUMENTS

| | | |
|---|---|---|
| 7,897,884 B2 | 3/2011 | Harish |
| 9,905,111 B1 | 2/2018 | Christ et al. |
| 10,139,211 B1 | 11/2018 | Tillinghast et al. |
| 2006/0266563 A1 | 11/2006 | Kaplan |
| 2017/0307433 A1 | 10/2017 | Espinosa |
| 2019/0100379 A1 | 4/2019 | Hatayan |
| 2019/0250025 A1* | 8/2019 | Dixon, Jr. ............... B65D 90/48 |

* cited by examiner

SELF-WEIGHING CONTAINER

CROSS REFERENCE TO RELATED APPLICATIONS

This application is a Continuation of copending U.S. application Ser. No. 15/894,666 filed on Feb. 12, 2018, which is hereby expressly incorporated by reference in its entirety into the present application.

BACKGROUND

Various agencies and companies provide parcel delivery services, such as the U.S. Postal Service, the Federal Express corporation (FedEx™), and the United Parcel Service corporation (UPS™). Often, the parcels that are delivered are containers composed of paper, cardboard, wood, etc., which enclose a delivery item(s) or good(s) that is being sent and delivered.

Generally, the cost of delivering a parcel (e.g., the shipping price) can vary depending on the weight of the container (including the delivery item(s) inside the container). Accordingly, containers and their enclosed item or goods are generally weighed prior to shipping and/or before the customer can pay for the shipping in order to determine the correct delivery cost or price. However, customers are often faced with situations where a scale for weighing a container is not readily available. For example, when a customer packages items into a container at home and then drops or deposits the container at a shipping or collection location where there is no scale (e.g. a corner mailbox or a drop box) and/or prior to business hours of the shipping or collection location (e.g., before a post office opens or before a delivery service's store opens).

Accordingly, there is a desire for systems and devices that that can weigh delivery items and/or determine a delivery price without access to a separate scale.

SUMMARY

Various aspects of the present disclosure describe a container for transporting delivery items. Various implementations of the container may include a weight-sensing device that is configured to sense a weight of a delivery item that is placed inside the container, a microcontroller that is connected to the weight-sensing device, and a display that is connected to the microcontroller. In such implementations, when a delivery item is placed in the container, the weight-sensing device produces a signal that corresponds to the weight of the delivery item and the microcontroller receives the signal and determines the weight of the delivery item based on the signal. The microcontroller transmits an indication of the weight to the display, the display displays the weight based on the indication of the weight.

In various embodiments or implementations, the structure of the container is a cardboard box and/or the container may be collapsible and/or the container is cuboid in shape.

In some embodiments, the weight-sensing device may include pressure indicating paper. The pressure indicating paper may produce a plurality of signals corresponding to different areas of the pressure indicating paper, and the microcontroller may determine the weight utilizing an algorithm that averages the plurality of signals from the pressure indicating paper.

In some other embodiments, the weight-sensing device may include one or more load cells, where each load cell of a plurality of load cells produces a signal that corresponds to a part of the weight of the delivery item that is sensed by the load cell. In such embodiments, the container further comprises a plate that is connected to the plurality of load cells and the delivery item that is placed in the container rests on the plate, which distributes the weight of the delivery item among the plurality of load cells. The microcontroller may calculate the weight based on the signals from the plurality of load cells. A plurality of load cells may produce a plurality of signals corresponding to different areas of the pressure indicating paper, and the microcontroller may calculate the weight utilizing an algorithm that averages the signals from the plurality of load cells.

In further embodiments, the container also includes an amplifier, where the weight-sensing device is connected to the microcontroller via the amplifier and the amplifier amplifies the signal from the weight-sensing device and transmits the amplified signal to the microcontroller. In some embodiments, the container may also include a temperature sensor connected to the microcontroller that produces a signal that corresponds to the temperature inside the container, a humidity sensor connected to the microcontroller that produces a signal that corresponds to the humidity inside the container, an accelerometer connected to the microcontroller that produces a signal that corresponds to movement of the container, a Global Positioning System receiver connected to the microcontroller that produces a signal that corresponds to global coordinates of the container, and/or a light sensor connected to the microcontroller that produces a signal that corresponds to light sensed within the container.

In still further embodiments, the container also includes a wireless transmitter connected to the microcontroller, and the microcontroller transmits an indication of the weight to a device via the wireless transmitter.

Other implementations of the container transporting delivery items may include a weight-sensing device that is configured to sense a weight of a delivery item that is placed inside the container, a microcontroller that is connected to the weight-sensing device, and a wireless transmitter connected to the microcontroller. When a delivery item is placed in the container, the weight-sensing device produces a signal that corresponds to the weight of the delivery item, the microcontroller receives the signal and determines the weight of the delivery item based on the signal, and the microcontroller transmits an indication of the weight to a device via the wireless transmitter.

In some embodiments, the device is a user device that displays the weight in response to receiving the indication of the weight from the microcontroller. In some embodiments, the device is a server that receives and stores the indication of the weight in a database, and transmits the indication of the weight to a user device based on a request received from the user device.

In various embodiments, the container is a cardboard box. And in some of those embodiments, the cardboard box is made of corrugated fiberboard, the microcontroller is connected to the weight-sensing device via a plurality of wires, and the plurality of wires are within corrugations of the corrugated fiberboard.

In some embodiments, the weight-sensing device may be pressure indicating paper and/or the container is collapsible. In other embodiments, the weight-sensing device may be a plurality of load cells, and each load cell of the plurality of load cells produces a signal that corresponds to a part of the weight of the delivery item that is sensed by the load cell. In such embodiments, the container may be prefabricated in a cuboid shape and may include a plate that is connected to the plurality of load cells, such that when a delivery item that is placed in the container rests on the plate, the plate distributes the weight of the delivery item among the plurality of load cells. The microcontroller may calculate the weight based on signals from the plurality of load cells.

In yet other embodiments, the container may further include an amplifier, wherein the weight-sensing device is connected to the microcontroller via the amplifier, and the amplifier amplifies the signal from the weight-sensing device and transmits the signal that was amplified to the microcontroller.

In still other embodiments, the container may also include a push-button switch connected to the microcontroller that causes the microcontroller to change units of the display, a temperature sensor connected to the microcontroller that produces a signal that corresponds to the temperature inside the container, a humidity sensor connected to the microcontroller that produces a signal that corresponds to the humidity inside the container, an accelerometer connected to the microcontroller that produces a signal that corresponds to movement of the container, a Global Positioning System receiver connected to the microcontroller that produces a signal that corresponds to global coordinates of the container, and/or a light sensor connected to the microcontroller that produces a signal that corresponds to light sensed within the container.

Other implementations, embodiments or variations will be apparent to those of ordinary skill from reading the present disclosure.

DESCRIPTION OF DRAWINGS

The accompanying drawings, which are incorporated in and constitute a part of this specification, illustrate embodiments of the present teachings and together with the description, serve to explain the principles of the present teachings. In the drawings.

DETAILED DESCRIPTION

Reference will now be made in detail to the present examples of embodiments of the disclosure, several examples of which are illustrated in the accompanying drawings.

Various embodiments include systems, methods, devices, and manufactures that include and/or utilize content-weighing containers. As used herein, a container can be any type of object that can be used to contain one or more items. In some examples described herein, the container may be composed primarily of cardboard (e.g., a cardboard box). As used herein, "cardboard" can refer to any type of heavy paper or paper-like material, such as card stock, corrugated fiberboard, pasteboard, or paperboard. However, in further embodiments, the principles and features described herein can be used with containers composed of other materials, such as fabric, wood, light-weight paper, composites, etc.

As further described herein, the container can include a self-weighing or content-weighing mechanism or apparatus, that includes, for example, one or more of a weight-sensing device (e.g., pressure indicating paper or load cells), a plate, electrical wires, a battery, a microcontroller, an amplifier, a display, zero or more push-button switch(es), a wireless transceiver, one or more additional sensing devices, (e.g., a temperature sensor, a humidity sensor, or a GPS sensor), etc. In this disclosure, the term "self-weighing" is used interchangeably with the term "content-weighing."

The self-weighing containers can provide various advantages over prior delivery systems and container technologies. For example, the self-weighing containers can allow users to prepare and ship a container without requiring extra equipment (e.g., a separate scale). Additionally, in some embodiments, the self-weighing container can communicate with a device of the shipper, a device of recipient, and/or with devices of the delivery service to, for example, determine and transmit the weight of the item(s) within the container (e.g., for shipping costs calculation and/or tamper/removal detection), determine a location of the container, determine if the container has been opened during shipping, determine if the container or items have been damaged during shipping, etc.

In various implementations, the self-weighing containers can be used in any type of delivery system provided by any type of delivery service, such as the U.S. Postal Service (U.S.P.S.), the FedEx™ company, or the UPS™ company.

Figure 1:
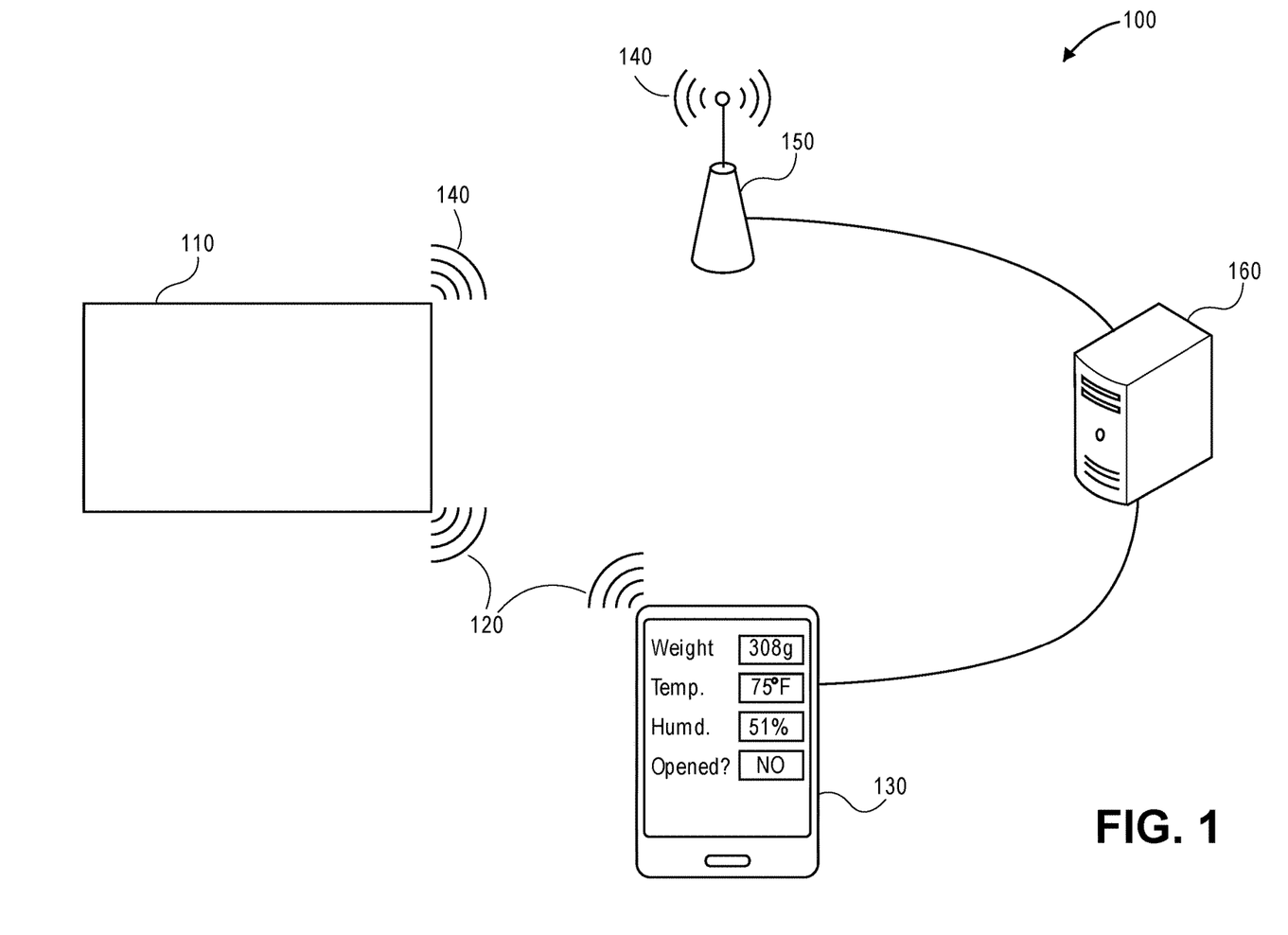
FIG. 1 is a diagram illustrating an example of a system for tracking and receiving information from containers prior to and during delivery, consistent with certain disclosed embodiments.

FIG. 1 is a diagram illustrating an example of a system 100 for tracking and receiving information from containers prior to and during delivery, consistent with certain disclosed embodiments. As shown in FIG. 1, the computing system 100 can include a container 110, a user device 130, a wireless access point 150, and a server 160. Also depicted are a wireless communication link 120 between the container 110 and the user device 130 and a wireless communication link 140 between the container 110 and the access point 150.

The container 110, as depicted in FIG. 1, can be a self-weighing container, according to the various embodiments described in, for example, FIGS. 2-10. The container 110 can include a wireless transceiver (not shown in FIG. 1) for communicating with the user device 130 and/or the wireless access point 150. In some embodiments, the wireless transceiver may only be a wireless transmitter that transmits signals (e.g., the wireless signals of the links 120 and 140) that can be received by the user device 130 and/or the wireless access point 150. In other embodiments, the wireless transceiver may be able to transmit and receive signals (e.g., the wireless signals of the links 120 and 140) to and from the user device 130 and/or the wireless access point 150. In some embodiments, the container 110 can include a display for displaying container information, such as delivery item weight, temperature, humidity, etc., as described in further detail below. In further embodiments, the container 110 can include controls, such as push-button switches, that can be used to, for example, switch between displays of different types of container information, switch between different measurement units (e.g., grams, pounds, Celsius, Fahrenheit, etc.), indicate a tare weight, etc.

In various implementations, the user device 130 can be any type of one or more computing devices. For example, the user device 130 can be a portable computing device, such as a smartphone, a tablet computer, a smartwatch, any type of portable Internet-of-Things (IoT) device, etc. As a further example, the user device 130 can be a desktop computer, any type of stationary IoT device, etc. In various implementations, the user device 130 can execute an application or program that causes the user device 130 to perform some or all of the functions described in this disclosure. In some implementations, the application or program may be provided by or downloadable from a delivery service, such as the U.S.P.S. Additionally, in another exemplary implementation, the user's portable computing device may be programmed to act as a conduit in order to retrieve information from a remote computing device, such as a web server for delivery services. The remote computing device may provide the user with delivery-related content, such as a website, a video, or an augmented reality/virtual reality experience. In some such implementations, the portable computing device may provide or add package-related data to content provided by the remote computing device, such as providing the container-detected item weight to the remote computing device to pre-populate a package-shipping web page, such as the Click-n-Ship web page provided by the U.S.P.S.

The user device 130 can communicate with the container 110 via the wireless signal link 120 to or from the container 110. As described herein, a wireless signal can be any type of analog or digital wireless signal, such as a Bluetooth™ signal, a 3G signal, a 4G signal, a 5G signal, a radio signal, a Wi-Fi signal, and the like. Additionally, the user device 130 can communicate with the server 160 via wired and/or wireless signals in one or more wired and/or wireless networks (not shown in FIG. 1). In various embodiments, the user device 130 can communicate with the server 160 through a wide-area network, such as the Internet. For example, the user device 130 can receive, from the container 110 or the server 160, location information of the container 110, an indication of tampering associated with the container 110, an indication of temperature and/or humidity within the container 110, an indication of movement of the container 110, etc.; any of which may be detected by a sensor(s) of the container 110.

In some embodiments, the user device 130 can include a display, and the display can be used to display container information corresponding to and transmitted from the container 110. The container information can be detected by the container 110 using the features and sensors described in further detail below.

In further embodiments, the user device 130 can include or be communicatively connected to a printer (not shown in FIG. 1) for printing a shipping label based on the weight of the delivery item as determined by the self-weighing container 110, as described in further detail below.

As noted above, in some implementations, the user device 130 can run an application provided by a delivery service. In other implementations, the wireless signal link 120 from the container 110 to the user device 130 can result in a push notification that causes a message to pop up on the user device 130, which directs a user of the user device 130 to a website of a delivery service. The application or website can allow the user to, for example, communicate with the container 110 (via the wireless signal link 120 and/or via communications with the server 160), calculate shipping costs using a weight determined by the container 110, receive an indication of a location of the container 110 during shipping, receive an indication of whether the container 110 has been tampered with during shipping, receive an indication of a temperature or humidity within the container 110, receive an indication of whether an accelerometer has been triggered, etc.

In further implementations, the container 110 may include a barcode or the like on its outside that can be scanned using a camera and barcode processing software of the user device 130. In such implementations, the barcode may direct a browser of the user device 130 to a website of a delivery service, where the user can perform various operations, such as entering in a weight of the container 110 and/or its contents and determine a shipping price and/or accessing information about the container 110 from the server 160.

The access point 150 can be any type of one or more devices capable of receiving and/or sending wireless signals and communicating with the server 160. For example, the access point 150 can be a standalone device connected to a network router in a wired network or can be a device that is integrated with a network router.

The access point 150 can communicate with the container 110 via the wireless signal link 140 to or from the container 110. Additionally, the access point 150 can communicate with the server 160 via wired and/or wireless signals in one or more wired and/or wireless networks (e.g., the Internet) (not shown in FIG. 1). Accordingly, the container 110 can transmit container information to the server 160 via the wireless signal link 140 and the access point 150. For example, the container 110 can transmit, to the server 160, weight information, location information, humidity information, temperature information, accelerometer information, light detection information, a container identifier, etc.

The server 160 can be any type of one or more computing devices capable of communicating with the access point 150 and/or the user device 130 via wired and/or wireless signals in one or more wired and/or wireless networks (e.g., the Internet). In some embodiments, the server 160 may be controlled by the delivery service that delivers the container 110, and the server 160 may maintain a database of container information for multiple containers, such as container identifiers, last known locations, shipping weights, shipping price, origin location (e.g. return address), delivery location (e.g., delivery address), last known temperatures, last known humidity values, whether tampering has been detected, whether an accelerator has been triggered, etc. The server 160 can receive at least part of the container information from the container 110 via the access point 150 and a communication network and/or from the user device 130 via a communication network. Additionally, the server 160 can transmit container information to the user device 130 for displaying to the user (e.g., based on a request from the user device 130).

In an example use of the system 100, a user can put a delivery item in the container 110, and the container 110 can determine the weight of the delivery item. An indication of the weight of the delivery item can be communicated to the user device 130 (e.g., via the wireless signal 120). Alternatively or additionally, an indication of the weight of the delivery item can be displayed by the container 110, e.g., using an LCD display as described below. The indication of the delivery item weight can be entered into and/or displayed on the user device 130, and the user device 130 can determine a shipping cost for the container 110 using the delivery item weight in combination with other information, for example, a destination address entered or indicated by the user. Based on the delivery item weight, the origin address, the destination address, and/or the shipping cost, the user device can format and send an instruction to a printer to print a shipping label, the user can affix the shipping label to the container 110, and the user can deposit the container 110 with a delivery service that will deliver the container. In various implementations, the container 110 can communicate its container information to the server 160 via the wireless communication link 140 and/or the access point 150, for example, whenever within wireless range. The container information received by the server 160 can include, for example, the delivery item weight, Global Positioning System (GPS) coordinates of the container 110, a temperature inside the container 110, a humidity inside the container 110, an indication of whether light has been detected in the container 110 during shipping, an indication of whether an accelerometer has been triggered (e.g., exceeded a predetermined threshold for an acceleration amount) during shipping, etc. The server 160 can store the container information in a database and/or transmit some or all of the container information during shipping to the user device 130. The user device 130 can display the container information during shipping for the user.

The system 100 in merely an example of a system that can be used with disclosed embodiments, and is not intended to be limiting. In various embodiments, additional devices or fewer devices and/or functions can be included in the system and the devices can communicate via one or more networks. For example, the system 100 can include multiple containers, multiple user devices (of multiple users), multiple access points, multiple servers, and other devices (e.g., databases, printers, scanners, etc.).

Figure 2:
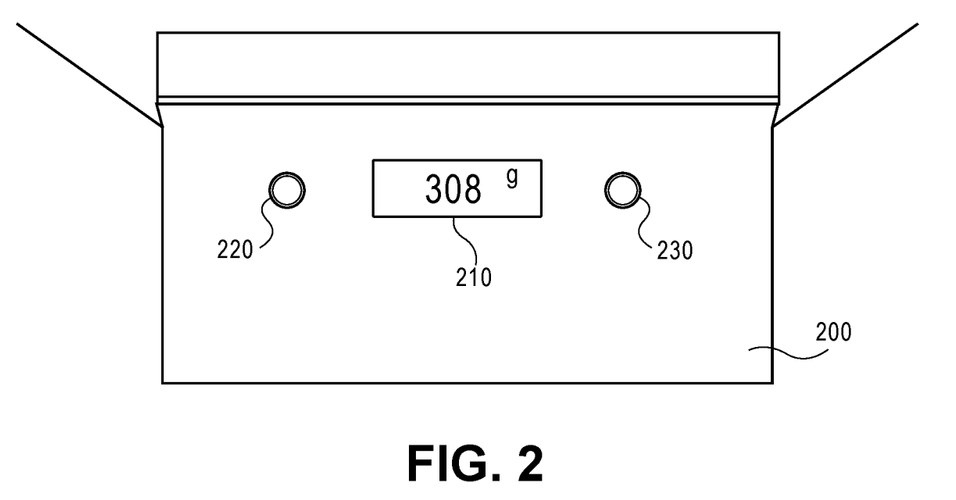
FIG. 2 is a diagram illustrating an example of a front view of a container, consistent with an embodiment of the invention.

FIG. 2 is a diagram illustrating an example of a front view of a container 200 with its top flaps open, consistent with an embodiment of the invention. As shown in FIG. 2, the container 200 can include a display 210, and one or more controls, such as a push-button switch 220 and a push-button switch 230. In some embodiments, the container 200 can be the container 110, shown in FIG. 1. In other embodiments, the container 200 may not include a wireless transceiver and may not communicate directly with other devices.

In some embodiments, when a user puts one or more items into the container 200, the container 200 will determine a weight of the one or more items, as described below, and display the weight on the display 210. In additional embodiments, the user may turn on or off the display 210 using the push-button switch 220 or the push-button switch 230. In further embodiments, the push-button switch 220 or the push-button switch 230 can be used to perform or activate one or more of the following functions: switch between displays of different container information (e.g., weight, temperature, humidity, etc.), switch between different measurement units (e.g., grams, pounds, Celsius, Fahrenheit, etc.), indicate the tare weight of the container 200, etc.

In further implementations, the container 200 can be a self-weighing container composed primarily of cardboard. In some embodiments, the container 200 can be cuboid in shape, as shown in FIG. 2, cylindrical, or any other shape that can contain a delivery item. In further embodiments, the container 200 can be collapsible and can be formed into a cuboid shape by the user. In other embodiments, the container 200 can be prefabricated in a cuboid shape and may not be collapsible.

In some implementations, the display 210 can be any type of volatile or static flat panel display. For example, the display 210 can be a light-emitting diodes (LED) display, a liquid crystal diode (LCD) display, an electronic paper display, an electronic ink display, a plasma display panel (PDP) display, and the like. In some embodiments, the display 210 can be on the side of the container, as shown in FIG. 2. In further embodiments, the display 210 can be embedded within or inset into the material of the container 200 (e.g., within a prefabricated cavity or hole in the cardboard on the side of the container 200). In other embodiments, the display 210 can be affixed to the container 200 using an adhesive or a fastener(s).

In some implementations, the display 210 may automatically turn off after a set period of inactivity (e.g., a time during which the push-button switches are not activated), such as, for example three minutes.

In some embodiments, the display 210 can be connected via one or more wires to other components (not shown in FIG. 2) of the container 200 (e.g., a microcontroller, as discussed in further detail below) and can be powered by one or more batteries (not shown in FIG. 2), which may, for example, be within the display and/or elsewhere in or built into the container 200 or other components of the container 200 (e.g., load cells, an amplifier, the microcontroller, a separate power source, etc.). In embodiments wherein the display 210 includes one or more batteries, the display 210's batteries may provide power to other components of the container 200. As used herein, a "battery" can refer to any type of device (e.g., electrochemical cells) that can provide power to electrical devices. For example, a battery can be a primary discardable battery, a secondary rechargeable battery, a printable cell integrated in a sheet of paper, etc.

In further implementations, the push-button switch 220 and/or the push-button switch 230 can be any type of switching mechanism that, when activated by a user, can send a signal(s) to a microcontroller (not shown in FIG. 2) that is a component of the container 200. In various embodiments, the push-button switch 220 and/or the push-button switch 230 can be embedded within or inset into the material of the container 200 (e.g., within a prefabricated cavity or cavities in the material that composes the side of the container 200). In other embodiments, the push-button switch 220 and/or the push-button switch 230 can be affixed to the container 200 using an adhesive or fastener(s). In some embodiments, the push-button switch 220 and/or the push-button switch 230 can be connected to the display 210 and/or to a microcontroller within the container 200 via one or more wires (not shown in FIG. 2).

In other implementations, different types of controls or input devices can be used instead of a push-button switch. For example, a keypad can be embedded in the container 200 and can allow a user to manually input information, such as a destination address, an origination address, a type of delivery service (e.g., standard, overnight, etc.), a manually entered weight, etc.

The container 200 shown in FIG. 2 is merely an example of a container, consistent with disclosed embodiments, and is not intended to be limiting. Many variations are possible within the scope of this disclosure. For example, in various embodiments, the container 200 can be a different shape than depicted in FIG. 2, the display 210 can be in a different location, the container 200 can include additional displays or no displays, the push-button switches 220 or 230 can be in different locations, and/or the container 200 can include fewer or additional controls. For example, the display 210 can be on a different side of the container 200, can be on the top or the bottom of the container 200, etc. As a further example, the push-button switches 220 or 230 can be on different sides of the container 200, can be on the top or the bottom of the container 200, can be on the same side as the display 210, or one or more can be on different sides than the display 210.

Figure 3:
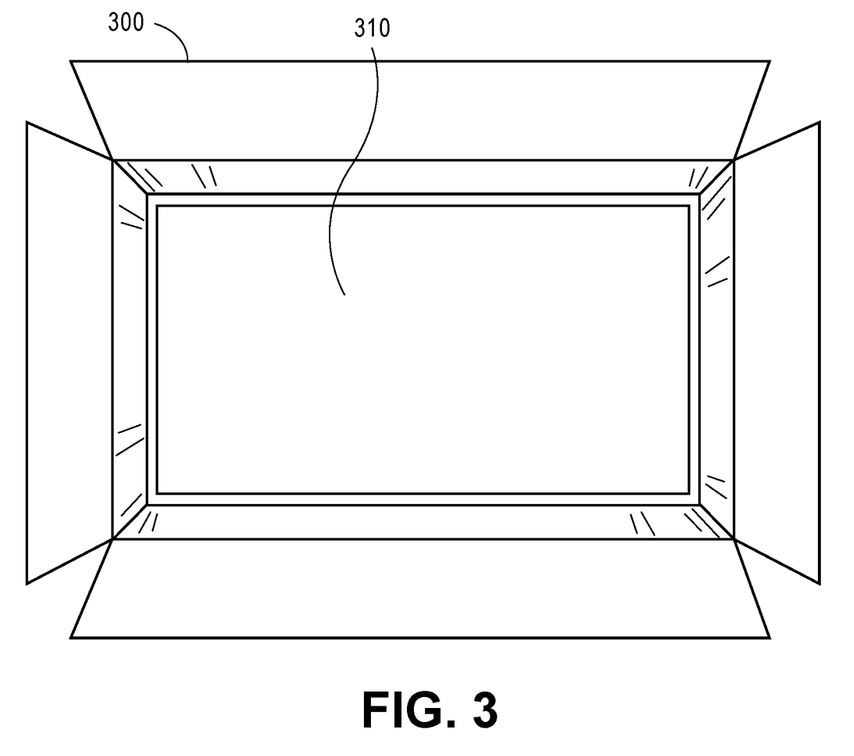
FIG. 3 is a diagram illustrating an example of an overhead view of a container, consistent with an embodiment of the invention.

FIG. 3 is a diagram illustrating an example of an overhead view of a container 300, consistent with an embodiment of the invention. As shown in FIG. 3, the top flaps of the container 300 are open and the container 300 can include a plate 310 on or as its inside bottom surface. In some embodiments, the container 300 can be the container 110, shown in FIG. 1, and/or the container 200, shown in FIG. 2. Accordingly, the container 300 may or may not include a wireless transceiver and may or may not include a display and push-button switches.

In some embodiments, when a user puts one or more items into the container 300 and onto the plate 310, the container 300 determines the weight of the one or more items, as described below. The determined weight may be transmitted to another device, as described with regard to FIG. 1 and/or can be displayed on a display of the container 300, as described with regard to FIG. 2.

In some implementations, the container 300 can be a self-weighing container composed primarily of cardboard. In some embodiments, the container 300 can be cuboid in shape, as shown in FIG. 3, cylindrical, or any other shape that can contain a delivery item. In further embodiments, the container 300 can be prefabricated in a cuboid shape and may not be collapsible. For example, the plate 310 may prevent the container 300 from being collapsed and/or distributed in a collapsed state, as is common with conventional cardboard boxes.

In some implementations, the plate 310 can be composed of any type of stiff, lightweight material, such as cardboard. In certain implementations, the plate 310 may be a rigid, puncture resistant, and shatter proof material, such as thicker forms of cardboard (e.g., corrugated fiberboard), a cardboard/plastic laminate, or thermoplastics. The plate 310 can be positioned over and can be in contact with one or more load cells (not shown in FIG. 3) that are components of the container 300. Thus, when one or more items are placed on the plate 310, the plate 310 distributes and/or transfers the weight of the one or more items among the load cell(s), which detects, measures or otherwise senses at least the weight, and the weight of the one or more items can be calculated based on a signal(s) from the one or more load cells. Rigid materials may be used for the plate 310 to promote or ensure accuracy of the calculated weight, and/or puncture resistant and shatter proof materials may be used for the plate 310 to ensure that the plate is not damaged during use or shipping. In various implementations, the container 300 may calculate the weight of the item(s) contained therein before, during, and/or after shipping. In various implementations, the container 300 can be reused multiple times.

The container 300 is merely an example of a container, consistent with disclosed embodiments, and is not intended to be limiting. Various embodiments are possible within the scope of this disclosure; for example, the container 300 can be a different shape than depicted in FIG. 3, multiple plates can be included within the container 300, etc.

Figure 4:
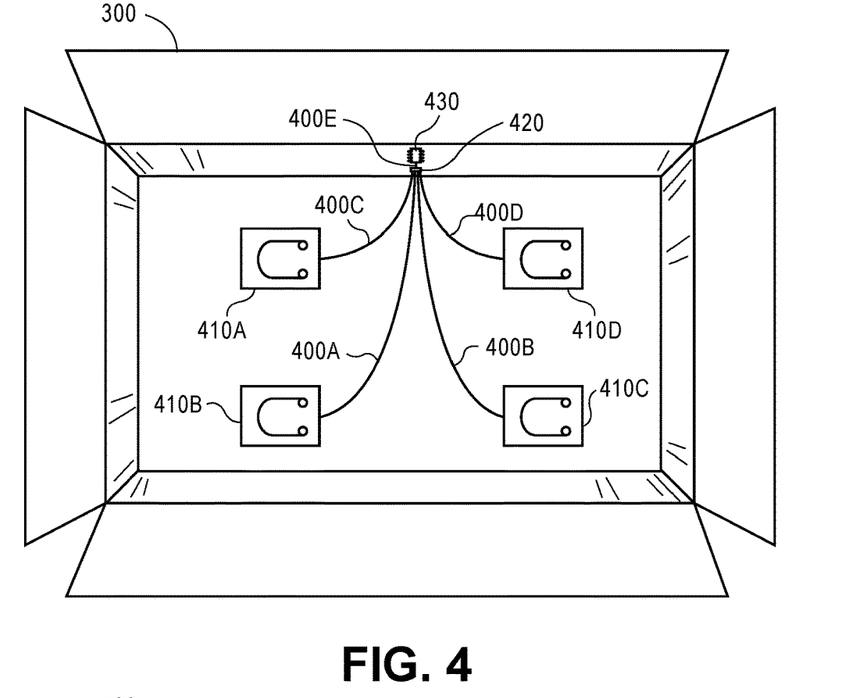
FIG. 4 is a diagram illustrating an example of an overhead view of a container, consistent with an embodiment of the invention.

FIG. 4 is a diagram illustrating an example of an overhead view of the container 300 with its top flaps open, consistent with an embodiment of the invention. The example shown in FIG. 4 can depict the self-weighing container 300, described above with regard to FIG. 3, with the plate 310 removed (or transparent) so as to show the components beneath the plate 310. When in position, the plate 310 would rest upon and/or be attached to one or more load cells 410A, 410B, 410C, and 410D. For clarity, the depiction shown in FIG. 4 does not show the bottom floor and/or folded-in bottom flaps of the container 300, upon which can be mounted load cells 410A, 4106, 410C, and 410D.

In some embodiments, as shown in FIG. 4, the container 300 can include wires 400A, 400B, 400C, 400D, and 400E, the load cells 410A, 410B, 410C, and 410D, an amplifier 420 (e.g., a signal amplifier), and a microcontroller 430. In FIG. 4, various components (e.g., the wires 400A, 400B, 400C, 400D, and 400E, the amplifier 420, and the microcontroller 430) are shown as visible, e.g., as being surface mounted on the structure (e.g., the cardboard) of the container 300 for ease of explanation. In other embodiments, a subset of the components may be visible within the container 300, while, in further embodiments, all or some of the components may be embedded within the material (e.g., cardboard) that makes up the structure of the container 300. For example, the cuboid box structure of the container 300 may be made from cut, creased, and folded corrugated fiberboard, and the wires 400A, 400B, 400C, 400D, and 400E, the amplifier 420, and/or the microcontroller 430 may be sandwiched between the outer surfaces of the corrugated fiberboard when the corrugated fiberboard is manufactured, such that the sandwiched components are not visible in the finished container 300.

In various embodiments, the wires 400A, 400B, 400C, 400D, and 400E can connect the components of the container 300 and can provide power to the components and/or transmit signals between components. The wires 400A, 400B, 400C, 400D, and 400E can be, for example, nonmetallic sheathed cables, single strand insulated wires, or any other type of wire capable of performing the functions described herein. The wires 400A, 400B, 400C, and 400D can connect the load cells 410A, 410B, 410C, and 410D to the amplifier 420, and the wire(s) 400E can connect the amplifier 420 to the microcontroller 430. In various implementations, the microcontroller 430 may also be operably connected to a display and/or push-button switches (which are not shown in FIG. 4).

In further embodiments, the load cells 410A, 410B, 410C, and 410D can be any type of sensor or transducer capable of creating an electrical signal or the like with a magnitude that is proportional to a force (e.g., weight) exerted on the load cell, as are known in the art. The load cells 410A, 410B, 410C, and 410D can be composed of metals, plastics, and/or any other material known in the art. In the example shown, the load cells can be connected to the amplifier 420 via the wires 400A, 400B, 400C, and 400D.

In some implementations, each of the load cells 410A, 4106, 410C, and 410D can include and be powered by a battery (not shown in FIG. 4). In other implementations, the load cells 410A, 410B, 410C, and 410D can be powered by other components of the container 300 (e.g., a separate power source, the microcontroller 430, a display, and/or the amplifier 420) via one or more wires (e.g., the wires 400A, 400B, 400C, 400D, and 400E).

In some embodiments, the amplifier 420 can be any type of amplifier capable of amplifying a signal from the load cells 410A, 410B, 410C, and 410D to the microcontroller 430. In some embodiments as shown, the signals from the load cells 410A, 410B, 410C, and 410D may be relatively small and not usable or processable by the microcontroller 430 and/or not readable over noise on the wires 400A, 400B, 400C, and 400D. Thus, the amplifier 420 can be used to amplify the signal transmitted to the microcontroller 430. The amplifier 420 can be any suitable electronic signal amplifier, as are known in the art, such as an operational amplifier or the like. In some implementations as shown, the amplifier 420 can be connected to the microcontroller 430 via the wire 400E. In other implementations, the amplifier 420 can be integrated with the microcontroller 430 or another component. In various implementations, the amplifier 420 can both amplify the load-cell signals and also function as analog-to-digital converter (ADC; e.g., a 24-bit ADC), which transmits or provides digital data representing the amplified signal to the microcontroller 430. In still further implementations, an amplifier may not be needed and may not be included in the container 300, and the microcontroller 430 can be directly connected to the load cells 410A, 410B, 410C, and 410D.

In some implementations, the amplifier 420 can include and be powered by a battery (not shown in FIG. 4). In other implementations, the amplifier 420 can be powered by other components of the container 300 (e.g., a separate power source, the microcontroller 430, a display, and/or the load cells 410A, 410B, 410C, and 410D) via one or more wires (e.g., the wires 400A, 400B, 400C, 400D, and 400E).

In additional embodiments, the microcontroller 430 can be any type of computer or processor(s) on an integrated circuit or a system on a chip. The microcontroller 430 can include one or more microprocessors along with memory, input/output ports, and the like. The microcontroller 430 can receive weight-information signals from the load cells 410A, 410B, 410C, and 410D via the amplifier 420. Additionally, the microcontroller 430 can process the signals and compute a weight corresponding to the forces exerted by an item(s) on the load cells 410A, 410B, 410C, and 410D via the plate 310. In various implementations, the microcontroller 430 may utilize an algorithm that averages and/or adds the signals from the load cells 410A, 410B, 410C, and 410D in order to calculate the weight of an item that is placed on the plate 310. As noted, in some embodiments, the microcontroller 430 can be connected to a display (e.g., the display 210 shown in FIG. 2), and can transmit instructions to the display to display the calculated weight. In other embodiments, the microcontroller 430 can include and/or be connected to a wireless transmitter or transceiver and can transmit the calculated weight to a user device (e.g., the user device 130 shown in FIG. 1) and/or to a server via an access point (e.g., the server 160 via the access point 150 shown in FIG. 1).

In some implementations, the microcontroller 430 can include and be powered by a battery (not shown in FIG. 4). In other implementations, the microcontroller 430 can be powered by other components of the container 300 (e.g., a separate power source, the amplifier 420, a display, and/or the load cells 410A, 410B, 410C, and 410D) via one or more wires (e.g., the wires 400A, 400B, 400C, 400D, and 400E).

In further embodiments, the microcontroller 430 can be connected to other types of sensors (not shown in FIG. 4), such as a GPS receiver, a temperature sensor, a humidity sensor, a light sensor, an accelerometer, and the like, and the microcontroller 430 can receive signals from the sensors (e.g., signals corresponding to global coordinates of the container 300, a temperature or humidity within the container 300, light sensed within the container 300, movement of the container 300, and the like), calculate or determine container information from the sensor signals, and transmit the container information via wireless communications or display the container information via a display.

The components shown in FIG. 4 are merely an example of components that can be included in a container, consistent with disclosed embodiments, and the example is not intended to be limiting. In various embodiments, the container 300 can include additional or fewer components (e.g., fewer load cells, additional wires, additional sensors, etc.).

Figure 5:
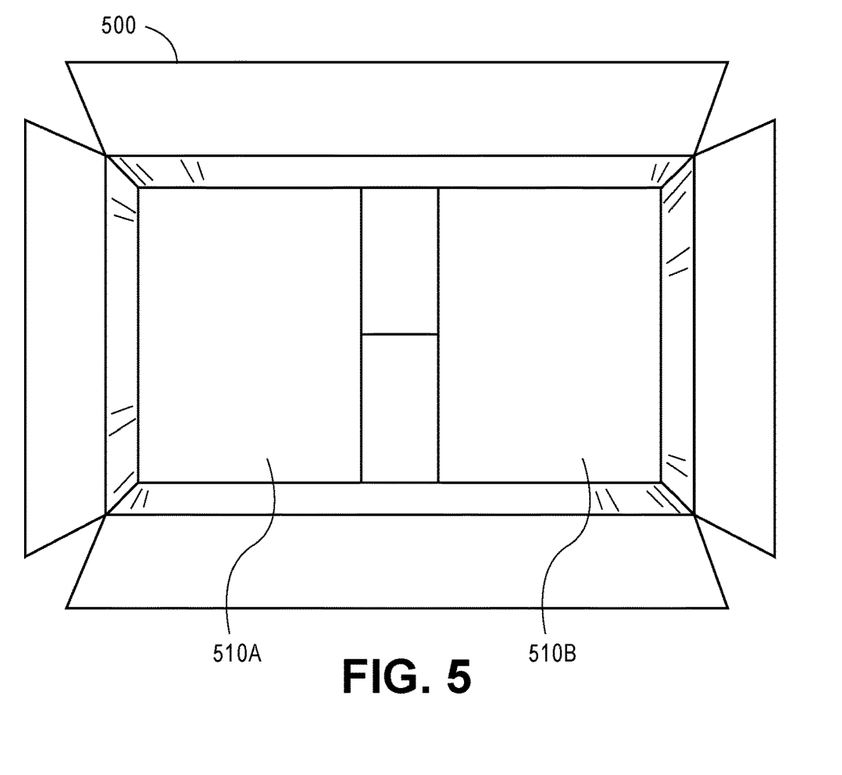
FIG. 5 is a diagram illustrating an example of an overhead view of a container, consistent with an embodiment of the invention.

FIG. 5 is a diagram illustrating an example of an overhead view of a container 500 with its top flaps open, consistent with an embodiment of the invention. The depiction shown in FIG. 5 shows the folded-in bottom flaps of the container 500, which is structured like a conventional cardboard box. As shown in FIG. 5, the container 500 can include pressure indicating paper 510A and pressure indicating paper 510B (also known as force sensitive film or paper), which may, as shown, be on top of two of the folded-in bottom flaps of the container 500. In various embodiments, the pressure indicating paper 510 may be composed of a material (e.g., a plastic film or paper) that changes its electrical resistance when force is applied to it, as is known in the art, such that the weight of the item(s) that is applying the force to the pressure indicating paper 510 can be calculated based on a measurement of the electrical resistance, which may be represented in a signal produced by the pressure indicating paper 510. In some embodiments, the container 500 can be the container 110, shown in FIG. 1, and/or the container 200, shown in FIG. 2. Accordingly, various implementations of the container 500 may or may not include a wireless transceiver and may or may not include a display and push-button switches.

In some embodiments, when a user puts one or more items into the container 500, the container 500 measures, calculates, and/or otherwise determines the weight of the one or more items, as described below. Information representing the weight may be transmitted to another device, as described with regard to FIG. 1 and/or can be displayed on a display on the container 500, as described with regard to FIG. 2.

In some implementations, the container 500 can be a self-weighing container composed primarily of cardboard. In some embodiments, the container 500 can be cuboid in shape, as shown in FIG. 5, cylindrical, or any other shape that can contain a delivery item. In further embodiments, the container 500 can be collapsible and/or may be distributed in a collapsed state, similar to conventional cardboard boxes. In further embodiments, the container 500 can be prefabricated in a cuboidal shape and may not be collapsible.

In some implementations, the pressure indicating paper 510A and 510B can be any known type of pressure-sensitive film or paper material, which may include materials or layers that include paper, plastics, and/or metals. Suitable examples of a pressure indicating paper are the "Prescale Film" manufactured by the Fujifilm Company and the "Pressure Sensitive Conductive Sheet (Velostat/Linqstat)" available from Adafruit Industries. In certain implementations, the pressure indicating paper 510A and 510B may be flexible. In further implementations, the pressure indicating paper 510A and 510B may be attached to the bottom flaps of a cardboard box (as shown in FIG. 5) using any suitable type of adhesive or fastener. The pressure indicating paper 510A and 510B may be able to transmit or produce an electrical signal indicating that a force (e.g., the weight of an item) is being exerted on the pressure indicating paper 510A and 510B and indicating the amount of force being exerted on the pressure indicating paper 510A and 510B. In some embodiments, the pressure indicating paper 510A and 510B may contain a grid of multiple cells, where each cell can indicate when force is exerted on the cell and/or an amount of force being exerted on the cell. For example, each cell can indicate the amount of force by producing or generating a voltage or a resistance that varies in amount based on the amount of force being applied. In various embodiments, the pressure indicating paper 510A and 5106 can be connected to electrical wires (not shown in FIG. 5) that can transmit the indications of pressure (e.g., the voltage or resistance) to an amplifier and/or a microcontroller, as discussed in further detail below.

The container 500 is merely an example of a container, consistent with disclosed embodiments, and is not intended to be limiting. Many variations are possible; for example, the container 500 can be a different shape than depicted in FIG. 5, a single piece of pressure indicating paper can be included within the container 500 that covers the entire bottom of the container 500, more than two pieces of pressure indicating paper can be included within or attached to the bottom flaps of the container 500, the inside bottom flaps may be longer so as to make up or cover essentially the entire inside bottom surface of the container 500, etc.

Figure 6:
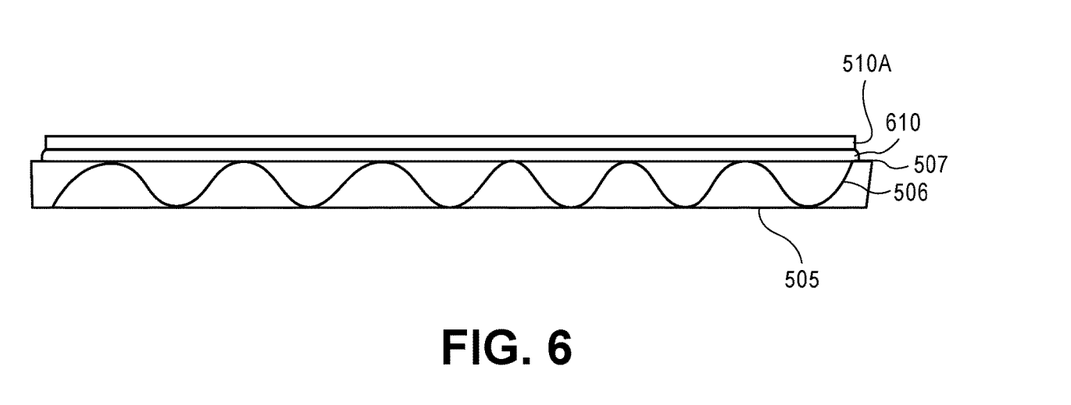
FIG. 6 is a diagram illustrating an example of a cross-sectional side view of a bottom flap of a container, consistent with an embodiment of the invention.

FIG. 6 is a diagram illustrating an example of a cross-sectional side view of a bottom flap of the container 500, consistent with an embodiment of the invention. In this particular embodiment, the example shown in FIG. 6 depicts a cross-sectional side view of one of the bottom flaps of the container 500, described above with regard to FIG. 5, which has pressure indicating paper 510A attached to it. In the example shown, the bottom flap of the container 500 may be composed of corrugated fiberboard, which has a flat first outer layer 505, at least one middle layer 506 that includes a fluted corrugated sheet, and a flat second outer layer 507. The pressure indicating paper 510A may be attached to the flat second outer layer 507 of the bottom flap by a layer of adhesive 610, as shown. In other embodiments, the pressure indicating paper 510A can be attached to the container 500 using other means, such as fasteners (e.g., staples), etc.

Figure 7:
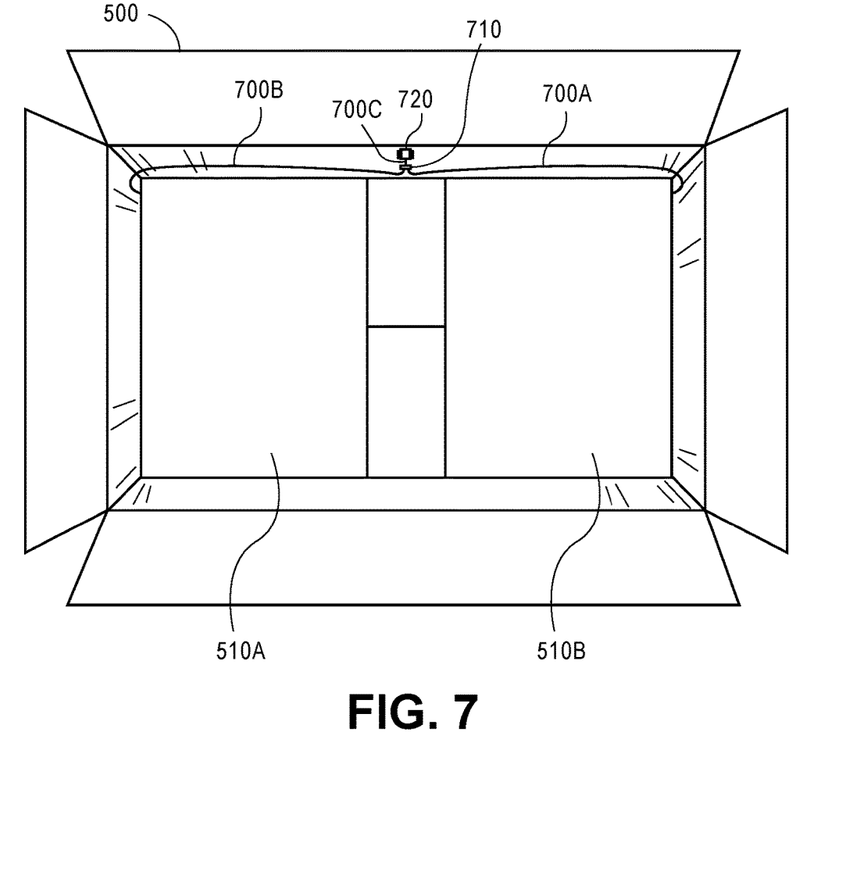
FIG. 7 is a diagram illustrating an example of an overhead view of a container, consistent with an embodiment of the invention.

FIG. 7 is a diagram illustrating an example of an overhead view of the container 500 with its top flaps open, consistent with an embodiment of the invention. The example shown in FIG. 7 can depict the container 500, described above with regard to FIGS. 5-6. In FIG. 7, the sides of the container 500 are depicted as transparent for clarity of explanation, in order to show the components that are embedded within the sides of the container 500. In some embodiments, as shown, the container 500 can include wires 700A, 700B, and 700C, the pressure indicating paper 510A and 5106, an amplifier 710, and a microcontroller 720. As noted, the components shown in FIG. 7 are shown as being visible for ease of explanation. In some embodiments, some or all of the components may be visible within (e.g., mounted on the inside surfaces of) the container 500, while, in other embodiments, some or all of the components may be embedded within the structural material of the container 500 (e.g., within the corrugation layer of corrugated fiberboard).

In various embodiments, the wires 700A, 700B, and 700C can connect the components of the container 500 and can provide power to the components and/or transmit signals between components. The wires 700A, 700B, and 700C can be, for example, non-metallic sheathed cables, single strand insulated wires, or any other type of wire capable of performing the functions described herein. The wires 700A and 700B can connect the pressure indicating paper 510A and 5106 to the amplifier 710, and the wire 700C can connect the amplifier 710 to the microcontroller 720.

In some implementations, the pressure indicating paper 510A and 5106 can be powered by other components of the container 500 (e.g., a separate power source, the microcontroller 720, a display, and/or the amplifier 710) via one or more wires (e.g., the wires 700A, 700B, and 400C).

In some embodiments, the amplifier 710 can be any type of amplifier capable of amplifying a signal from the pressure indicating paper 510A and 510B to the microcontroller 720. The amplifier 710 can be any suitable electronic amplifier, as are known in the art, such as an operational amplifier or the like. In some implementations, the amplifier 710 can be connected to the microcontroller 720 via the wire 700C. In other implementations, the amplifier 710 can be integrated with the microcontroller 720. In further implementations, an amplifier may not be included in the container 500, and the microcontroller 720 can be directly connected to the pressure indicating paper 510A and 510B.

In some implementations, the amplifier 710 can include and be powered by a battery (not shown in FIG. 7). In other implementations, the amplifier 710 can be powered by other components of the container 500 (e.g., a separate power source, a display, and/or the microcontroller 720) via one or more wires (e.g., the wires 700A, 700B, and 700C).

In additional embodiments, the microcontroller 720 can be any type of computer or processor(s) on an integrated circuit or a system on a chip. The microcontroller 720 can include one or more microprocessors along with memory and input/output ports and the like. The microcontroller 720 can, in some embodiments, receive weight-information signals from the pressure indicating paper 510A and 5108 via the amplifier 710. Additionally, the microcontroller 720 can process the signals and compute a weight corresponding to the forces exerted by an item(s) on the pressure indicating paper 510A and 5108 and/or forces exerted on individual cells of the pressure indicating paper 510A and 5108. In various implementations, the microcontroller 720 may utilize or implement an algorithm that averages and/or adds the signals from the individual cells of the pressure indicating paper 510A and 5108 in order to calculate the weight of an item that is placed on the pressure indicating paper 510A and 5108. In some embodiments, the microcontroller 720 can be connected to a display (e.g., the display 210 shown in FIG. 2), and can transmit instructions to the display to display the calculated weight. In other embodiments, the microcontroller 720 can include or be connected to a wireless transmitter or transceiver and antenna, and can transmit the calculated weight to a user device (e.g., the user device 130 shown in FIG. 1) and/or to a server via an access point (e.g., the server 160 via the access point 150 shown in FIG. 1).

In some implementations, the microcontroller 720 can include and be powered by a battery (not shown in FIG. 7). In other implementations, the microcontroller 720 can be powered by other components of the container 500 (e.g., a separate power source, a display, and/or the amplifier 710) via one or more wires (e.g., the wires 700A, 700B, and 700C).

In further embodiments, the microcontroller 720 can be connected to other types of sensors (not shown in FIG. 7), such as a GPS receiver, a temperature sensor, a humidity sensor, a light sensor, an accelerometer, and the like, and the microcontroller 720 can receive signals from the sensors, calculate or determine container information from or based on the sensor signals, and transmit the container information via wireless communications or display the container information via a display.

The components shown in FIG. 7 are merely an example of components that can be included in a container, consistent with disclosed embodiments, and the example is not intended to be limiting. In various embodiments, the container 700 can include additional or fewer components (e.g., fewer pieces of pressure indicating paper, additional wires, additional sensors, etc.).

Figure 8:
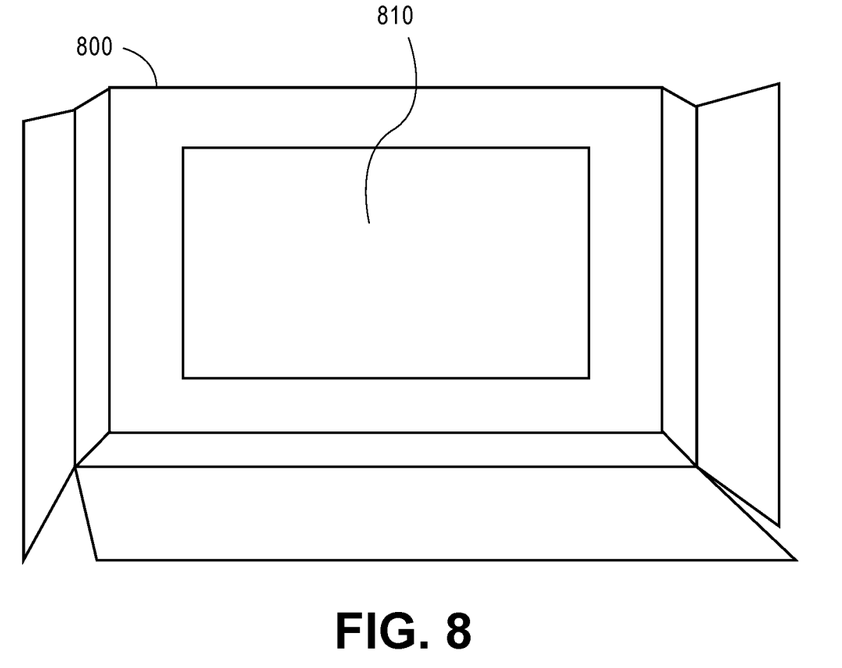
FIG. 8 is a diagram illustrating an example of a bottom view of a container, consistent with an embodiment of the invention.

FIG. 8 is a diagram illustrating an example of a bottom perspective view of a container 800, consistent with an embodiment of the invention. As shown in FIG. 8, the container 800 can include a plate 810 on its bottom surface. In some embodiments, the container 800 can be the container 110, shown in FIG. 1, and/or the container 200, shown in FIG. 2. Accordingly, the container 800 may or may not include a wireless transceiver and may or may not include a display and push-button switches.

In some embodiments, when a user puts one or more items in the container 800, a weight of the one or more items can be determined, as described below. The weight may be transmitted to another device, as described with regard to FIG. 1 and/or can be displayed on a display on the container 800, as described with regard to FIG. 2.

In some implementations, the container 800 can be a self-weighing container composed primarily of cardboard. In some embodiments, the container 800 can be cuboid in shape, as shown in FIG. 8, cylindrical, or any other shape that can contain a delivery item. In other embodiments, the container 800 can be prefabricated in a cuboidal shape and may not be collapsible. For example, the plate 810 may prevent the container 800 from being collapsed and/or distributed in a collapsed state.

In some implementations, the plate 810 can be composed of any type of stiff, lightweight material, such as cardboard. In certain implementations, the plate 810 may be a rigid, puncture resistant, and shatter proof material, such as thicker forms of cardboard (e.g., corrugated fiberboard, a cardboard/plastic laminate, or thermoplastics). The plate 810 can be affixed to the bottom of the container 800 using an adhesive or fasteners and positioned under and in contact with one or more load cells (not shown in FIG. 8) that are components of the container 800. Thus, when one or more items are placed in the container 800, the plate 810 distributes and/or transfers the weight of the one or more items among the load cell(s), which detects, measures or otherwise senses at least the weight, and the weight of the one or more items can be calculated based on a signal(s) from the one or more load cells. In some embodiments, rigid materials may be used for the plate 810 to promote or ensure accuracy of the calculated weight, and/or puncture resistant and shatter proof materials may be used for the plate 810 to ensure that the plate is not damaged during use or shipping. In various implementations, the container 800 may calculate the weight of the item(s) contained therein before, during and/or after shipping. In various implementations, the container 800 can be reused multiple times. In further embodiments, water resistant and/or thermal protective materials may be used for the plate 810 to protect the load cells from moisture and/or changes in temperature.

The container 800 is merely an example of a container, consistent with disclosed embodiments, and is not intended to be limiting. Various embodiments are possible within the scope of this disclosure; for example, the container 800 can be a different shape than depicted in FIG. 8, multiple plates can be included under and/or within the container 800, etc.

Figure 9:
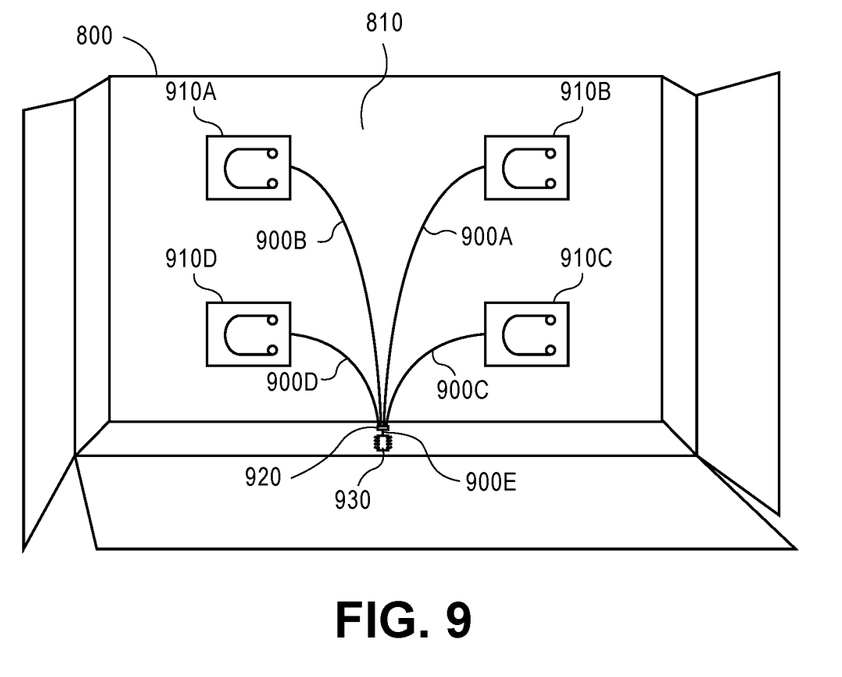
FIG. 9 is a diagram illustrating an example of a bottom view of a container, consistent with an embodiment of the invention.

FIG. 9 is a diagram illustrating an example of a bottom perspective view of the container 800, consistent with an embodiment of the invention. The example shown in FIG. 9 can depict the container 800, described above with regard to FIG. 8, where the plate 810 is removed, or the plate 810 and the sides and bottom of the container 800 are depicted as transparent to show the components covered by the plate 810 and within the sides and bottom of the container 800. When in position, the plate 810 would be attached to one or more load cells 910A, 910B, 910C, and 910D. For clarity, the depiction shown in FIG. 9 does not show the folded-in bottom flaps of the container 800, upon which are mounted the load cells 910A, 910B, 910C, and 910D.

In some embodiments, the container 800 can include wires 900A, 900B, 900C, 900D, and 900E, load cells 910A, 910B, 910C, and 910D, an amplifier 920, and a microcontroller 930. In FIG. 9, the non-structural components are shown as visible for ease of explanation. In some embodiments, the components may be surface mounted and thus visible within or outside the container 800, while, in other embodiments, the components may be embedded within the cardboard material of the container 800 (e.g., within the corrugations of corrugated fiberboard) and/or behind the plate 810, and thus not visible to a user.

In various embodiments, the wires 900A, 900B, 900C, 900D, and 900E can connect the components of the container 800 and can provide power to the components and/or transmit signals between components. The wires 900A, 900B, 900C, 900D, and 900E can be, for example, non-metallic sheathed cables, single strand insulated wires, or any other type of wire capable of performing the functions described herein. The wires 900A, 900B, 900C, and 900D can connect the load cells 910A, 910B, 910C, and 910D to the amplifier 920, and the wire(s) 900E can connect the amplifier 920 to the microcontroller 930. In various implementations, the microcontroller 920 may also be operably connected to a display 210 and/or push-button switches, (which are not shown in FIG. 9).

In further embodiments, the load cells 910A, 910B, 910C, and 910D can be any type of sensor or transducer capable of creating an electrical signal or the like with a magnitude that is proportional to a force (e.g., weight) exerted on the load cell. The load cells 910A, 910B, 910C, and 910D can be composed of metals, plastics, and/or any other material known in the art. In the example shown, the load cells can be connected to the amplifier 920 via the wires 900A, 900B, 900C, and 900D.

In some implementations, each of the load cells 910A, 910B, 910C, and 910D can include and be powered by a battery (not shown in FIG. 9). In other implementations, the load cells 910A, 910B, 910C, and 910D can be powered by other components of the container 800 (e.g., a separate power source, the microcontroller 930, a display, and/or the amplifier 920) via one or more wires (e.g., the wires 900A, 900B, 900C, and 900D).

In some embodiments, the amplifier 920 can be any type of amplifier capable of amplifying a signal from the load cells 910A, 910B, 910C, and 910D to the microcontroller 930. The amplifier 920 can be any suitable electronic signal amplifier, as are known in the art, such as an operational amplifier or the like. In some implementations as shown, the amplifier 920 can be connected to the microcontroller 930 via the wire 900E. In other implementations, the amplifier 920 can be integrated with the microcontroller 930 or another component. In further implementations, an amplifier may not be included in the container 800, and the microcontroller 930 can be directly connected to the load cells 910A, 910B, 910C, and 910D.

In some implementations, the amplifier 920 can include and be powered by a battery (not shown in FIG. 9). In other implementations, the amplifier 920 can be powered by other components of the container 800 (e.g., a separate power source, the microcontroller 930, a display, and/or the load cells 910A, 910B, 910C, and 910D) via one or more wires (e.g., the wires 900A, 900B, 900C, 900D, and 900E).

In additional embodiments, the microcontroller 930 can be any type of computer or processor(s) on an integrated circuit or a system on a chip. The microcontroller 930 can include one or more microprocessors along with memory and input/output ports and the like. The microcontroller 930 can receive weight-information signals from the load cells 910A, 910B, 910C, and 910D, for example, via the amplifier 920. Additionally, the microcontroller 930 can process the signals and compute a weight corresponding to the forces exerted by an item(s) on the load cells 910A, 910B, 910C, and 910D via the plate 810. As noted, in some embodiments, the microcontroller 930 can be connected to a display (e.g., the display 210 shown in FIG. 2), and can transmit instructions to the display to display the calculated weight. In other embodiments, the microcontroller 930 can include or be connected to a wireless transmitter or transceiver (e.g., a Bluetooth™ antenna, a 3G antenna, a 4G antenna, a radio signal antenna, a Wi-Fi antenna, etc.), and can transmit the calculated weight to a user device (e.g., the user device 130 shown in FIG. 1) and/or to a server via an access point (e.g., the server 160 via the access point 150 shown in FIG. 1).

In some implementations, the microcontroller 930 can include and be powered by a battery (not shown in FIG. 9). In other implementations, the microcontroller 930 can be powered by other components of the container 800 (e.g., a separate power source, the amplifier 920, a display, and/or the load cells 910A, 9106, 910C, and 910D) via one or more wires (e.g., the wires 900A, 9006, 900C, 900D, and 900E).

In further embodiments, the microcontroller 930 can be connected to other types of sensors (not shown in FIG. 9), such as a GPS receiver, a temperature sensor, a humidity sensor, a light sensor, an accelerometer, and the like, and the microcontroller 930 can receive signals from the sensors, calculate or determine container information from the sensor signals, and transmit the container information via wireless communications or display the container information via a display.

The components shown in FIG. 9 are merely an example of components that can be included in a container, consistent with disclosed embodiments, and the example is not intended to be limiting. In various embodiments, the container 800 can include additional or fewer components (e.g., fewer load cells, additional wires, additional sensors, etc.).

Figure 10:
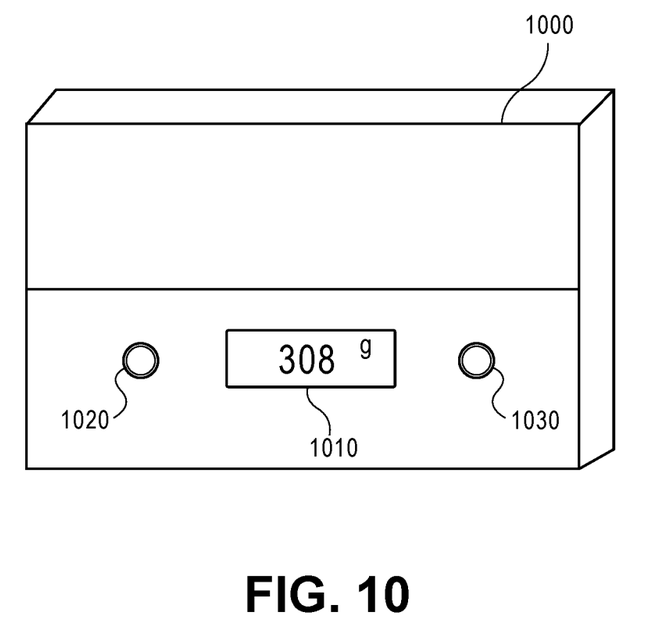
FIG. 10 is a diagram illustrating an example of an overhead view of a closed container, consistent with an embodiment of the invention.

FIG. 10 is a diagram illustrating an example of an overhead perspective view of a container 1000 with its top flaps closed, consistent with an embodiment of the invention. As shown in FIG. 10, the container 1000 can include a display 1010, and one or more controls, such as a push-button switch 1020, and a push-button switch 1030. In some embodiments, the container 1000 can be the container 110, shown in FIG. 1. In other embodiments, the container 1000 may not include a wireless transceiver and may not communicate directly with other devices.

In some embodiments, when a user places one or more items into the container 1000, the container 1000 will determine a weight of the one or more items, as described above, e.g., with respect to FIG. 9, and display the weight on the display 1010. In additional embodiments, the user may turn on or off the display using the push-button switch 1020 or the push-button switch 1030. In further embodiments, the push-button switch 1020 or the push-button switch 1030 can be used to perform or activate one or more of the following functions: switch between displays of different container information (e.g., weight, and in some embodiments, temperature, humidity, etc.), switch between different measurement units (e.g., grams, pounds, Celsius, Fahrenheit, etc.), indicate the tare weight of the container 1000, etc.

In some implementations, the container 1000 can be a self-weighing container composed primarily of cardboard. In some embodiments, the container 1000 can be cuboid in shape, as shown in FIG. 10, cylindrical, or any other shape that can contain a delivery item. In further embodiments, the container 1000 can be collapsible and can be formed into a cuboid shape by the user. In other embodiments, the container 200 can be prefabricated in a cuboid shape and may not be collapsible.

In some implementations, the display 1010 can be any type of volatile or static flat panel display. For example, the display 1010 can be an LED display, an LCD display, an electronic paper display, an electronic ink display, a PDP display, and the like. In some embodiments, the display 1010 can be on a top flap of the container 1000.

In some implementations, the display 1010 may automatically turn off after a set period of inactivity (e.g., a time during which the push-button switches are not activated), such as, for example five minutes.

In some embodiments, the display 1010 can be powered by one or batteries (not shown in FIG. 10), which may, for example, be within the display and/or elsewhere in or built into the container 1000 or other components of the container 1000 (e.g., load cells, an amplifier, a microcontroller, a separate power source, etc.). In embodiments wherein the display 1010 includes one or more batteries, the display 1010's batteries may provide power to other components of the container 1010.

In further implementations, the push-button switch 1020 and/or the push-button switch 1030 can be any type of switching mechanism that, when activated by a user, can send signals to a microcontroller within container 1000.

In an example implementation, a user can place an item she wants delivered in the container 1000 (or any other container described herein). Weight-sensing device(s) in the container 1000 can sense part or all of the force (weight) from the item and produce an electrical signal corresponding/proportional thereto. An amplifier (as described herein) can increase those signals, and the signals can be received by a microcontroller (as described here). The microcontroller can integrate the signals and/or perform an algorithm to determine a weight of the item based on all received signals. The microcontroller can also subtract the tare weight of the container (e.g., a tare weight indicated by the user via the push-button switch 1030) from the determined weight to obtain the total weight. The microcontroller can transmit the total weight wirelessly to a user device and/or a server and/or can display the total weight on a display (e.g., the display 1010).

The container 1000 is merely an example of a container, consistent with disclosed embodiments, and is not intended to be limiting. Many variations are possible within the scope of this disclosure. For example, in various embodiments, the container 1000 can be a different shape than depicted in FIG. 10, the display 1010 can be in a different location (e.g., as shown in FIG. 2), the container 1000 can include additional displays or no displays, the push-button switches 1020 or 1030 can be in different locations (e.g., as shown in FIG. 2), and/or the container 1000 can include fewer or additional push-button switches.

While the teachings have been described with reference to the examples of embodiments, those skilled in the art will be able to make various modifications to the described embodiments without departing from the true spirit and scope. The terms and descriptions used herein are set forth by way of illustration only and are not meant as limitations. In particular, although the method has been described in a specific order of steps, the steps of the method may be performed in a different order than illustrated, or may be performed simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. An apparatus for transporting delivery items, the apparatus comprising:
   a cardboard container;
   a weight-sensing device that is configured to sense a weight of a delivery item that is placed inside the cardboard container;
   a microcontroller that is connected to the weight-sensing device; and
   a display that is connected to the microcontroller;
   wherein, when a delivery item is placed in the cardboard container:
      the weight-sensing device produces a signal that corresponds to the weight of the delivery item;
      the microcontroller receives the signal and determines the weight of the delivery item based on the signal;
      the microcontroller transmits an indication of the weight to the display; and
      the display displays the weight based on the indication of the weight.
2. The apparatus of claim 1, wherein the cardboard container is a box.
3. The apparatus of claim 2, wherein the microcontroller is connected to the weight-sensing device using one or more wires that are within the cardboard of the box.
4. The apparatus of claim 1, wherein the cardboard container is a box that is made of two or more layers of cardboard.
5. The apparatus of claim 4, wherein the microcontroller is connected to the weight-sensing device using one or more wires that are between the two or more layers of cardboard of the box.
6. The apparatus of claim 1, wherein the cardboard container is collapsible.
7. The apparatus of claim 1, further comprising a wireless transmitter connected to the microcontroller, wherein the microcontroller transmits an indication of the weight to a device via the wireless transmitter.
8. The apparatus of claim 7, wherein the device is a user device that displays the weight in response to receiving the indication of the weight.
9. The apparatus of claim 7, wherein the device is a server that receives and stores the indication of the weight.
10. The apparatus of claim 1, further comprising an accelerometer that is connected to the microcontroller and that produces a signal that corresponds to an amount of acceleration experienced by the apparatus;
    wherein the microcontroller transmits an indication of the amount of acceleration to the display; and
    the display displays the amount of acceleration.
11. The apparatus of claim 1, wherein the weight-sensing device comprises pressure indicating paper.
12. An apparatus for transporting delivery items, the apparatus comprising:
    a cardboard container;
    a weight-sensing device that is configured to sense a weight of a delivery item that is placed inside the cardboard container;
    a microcontroller that is connected to the weight-sensing device; and
    a wireless transmitter connected to the microcontroller;
    wherein when the delivery item is placed in the cardboard container:
       the weight-sensing device produces a signal that corresponds to the weight of the delivery item;
       the microcontroller receives the signal and determines the weight of the delivery item based on the signal; and
       the microcontroller transmits an indication of the weight to a device via the wireless transmitter.
13. The apparatus of claim 12, wherein the cardboard container is a box.
14. The apparatus of claim 12, wherein the cardboard container is collapsible.
15. The apparatus of claim 12, wherein the device is a user device that displays the weight in response to receiving the indication of the weight from the microcontroller.
16. The apparatus of claim 12, wherein the device is a server that:
    receives and stores the indication of the weight in a database; and
    transmits the indication of the weight to a user device for display.
17. The apparatus of claim 12, further comprising an accelerometer that is connected to the microcontroller and that produces a signal that corresponds to an amount of acceleration experienced by the cardboard container;
    wherein the microcontroller transmits, via the wireless transmitter, an indication of the amount of acceleration to the device.
18. The apparatus of claim 12, wherein the weight-sensing device comprises pressure indicating paper.
19. The apparatus of claim 12, wherein the weight-sensing device comprises a load cell.
20. The container apparatus of claim 12, further comprising one or more selected from a group consisting of:
    a temperature sensor connected to the microcontroller that produces a signal that corresponds to temperature inside the cardboard container;
    a humidity sensor connected to the microcontroller that produces a signal that corresponds to humidity inside the cardboard container;

a Global Positioning System (GPS) receiver connected to the microcontroller that produces a signal that corresponds to GPS coordinates of the cardboard container; and a light sensor connected to the microcontroller that produces a signal that corresponds to light sensed within the cardboard container.

\* \* \* \* \*